Patented May 18, 1948

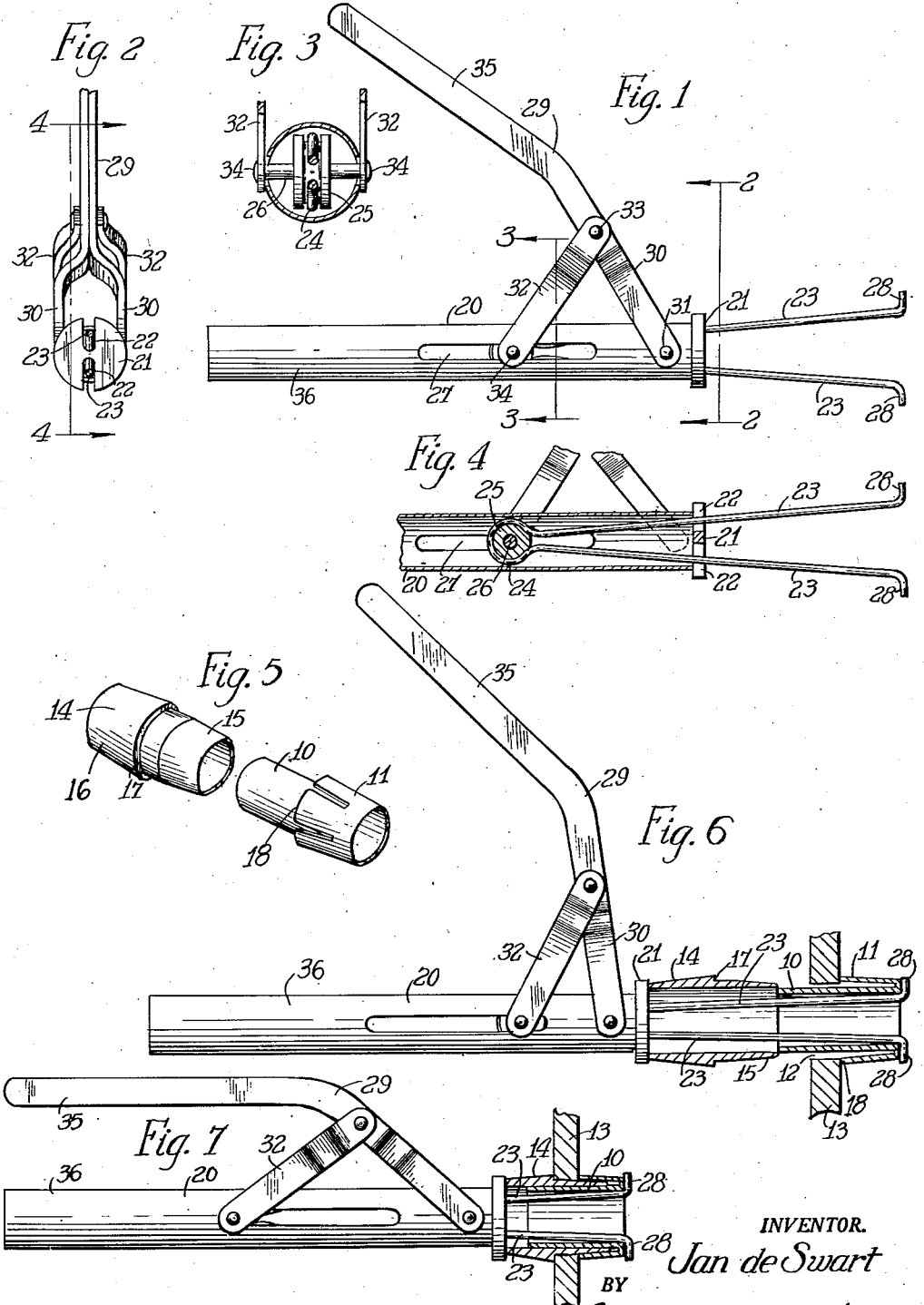

2,441,756

UNITED STATES PATENT OFFICE 2,441,756

BUSHING APPLICATOR

Jan de Swart, Eagle Rock, Calif., assignor to Shellmar Products Corporation, Mount Vernon, Ohio, a corporation of Delaware Application November 14, 1945, Serial No. 628,586

3 Claims. (Cl. 218—25)

My invention is concerned with a hand tool, or applicator, for installing plastic bind grommets.

It is an object of my invention to provide a hand tool, or applicator, which is particularly designed for installing in an aperture in a partition, or the like, a plastic grommet or bushing, of the type which comprises two complementary sections, one of which is provided with an expandable skirt which is adapted to be placed in the aperture, while the other is telescoped therewith to expand the skirt thereon and frictionally secure both sections together in such a manner that the surfaces of the partition adjacent the aperture are engaged by the skirt on the one section and a cooperating shoulder on the other section whereby the grommet is rigidly secured in the aperture.

It is a further object of my invention to provide an applicator tool for use in applying grommets or the like which is easy to use, which operates efficiently, and which may be readily and cheaply constructed.

These and other objects will be apparent from the description of my applicator tool which is illustrated, by way of example, in the accompanying drawings, wherein:

Fig. 1 is an elevation of my grommet applicator;

Fig. 2 is an end elevation of the line 2—2 of Fig. 1;

Fig. 3 is a section on the line 3—3 of Fig. 1;

Fig. 4 is a longitudinal section on the line 4—4 of Fig. 2;

Fig. 5 is an exploded perspective view of the two-part grommet;

Fig. 6 is a view of the applicator with the grommet members placed thereon and in position in the aperture in a partition in which it is to be installed, the grommet members being shown in section; and Fig. 7 is a view similar to Fig. 5 with the grommet members in engaged relation just prior to removal of the applicator.

My applicator tool is designed to install a grommet or bushing of the type which comprises an inner tubular section 10, having an integral split skirt 11, which is adapted to be passed through the aperture 12 in the partition 13, and an outer tubular section 14, which is provided with a beveled outer surface 15 on one end and an enlarged portion 16 having an inner shoulder 17 on the other end. The outer tubular section 14 of the grommet is adapted to be telescoped over the inner section 10 to engage the beveled surface 15 with the skirt 11 and spread it outwardly whereby the forward edge 18 of the same is brought into abutting relation with the one surface of the partition 13, while the shoulder 17 is moved into abutting relation with the other surface of the partition 13 and the grommet is frictionally secured in the aperture.

The applicator comprises a tubular portion 20 having a head 21 on one end provided with oppositely directed aligned radial slots 22. Movable and guided in the slots 22 are a pair of finger members 23 which may be made of spring rod material bent to generally U-shaped or V-shaped form as shown in Fig. 4 with the bight or connecting portion 24 looped around an eyelet 25 loosely carried on a cross pin 26 which is movable longitudinally of the body 20 of the tool in the aligned guide slots 27. The free ends of the fingers 23 have oppositely directed bent-over members 28. A handle member 29 is provided with a bifurcated end 30 which is pivoted at 31 to the body 20 of the tool adjacent the headed end thereof. Link members 32 are pivoted at one end at 33 to the handle 29, and at the other end, they are secured to the ends 34 of the pin 26. The handle 29 is provided with a grip portion 35 while the body 20 of the tool is extended to provide a grip 36.

To apply the grommet the fingers 23 are manually pushed toward each other and the sections 10 and 14 are placed on the fingers 23 with the latter in their extended position (Fig. 6), the ends 28 of the fingers 23 engaging the skirted portion of the grommet section 10 and the head 21 of the tool engaging portion 16 of the grommet section 14. The operator then grips the portions 35 and 36 of the handle 29 and the body 20 of the tool, respectively, and after moving the grommet section 10 into position in the aperture 12, draws the handle 29 toward the body 20 thereupon moving the head 21 and the free ends of fingers 23 toward each other to force the grommet sections 10 and 14 into telescoping relation to engage the edge of skirt 11 with one face of plate 13 and the shoulder 17 with the other face of the plate 13. The handle 29 may then be moved away from the body 20 and the fingers 23 manually moved toward each other sufficiently to withdraw them from the grommet. The guide slots 22 in the head 21 are relatively deep and permit movement of spring fingers 23 toward each other to free the ends 28 from engagement with the grommet section 10.

While I have described my applicator as embodying specific details of construction, it is con-

I claim:

1. A grommet applicator comprising an elongate body having a bore therein, an abutment surface at one end provided with a pair of radially disposed elongate apertures, a slidable member in said bore, a pair of elongate spring finger members extending from said slidable member through the apertures in the closed end of said body, said spring finger members having lateral, outwardly directed abutments adjacent the free ends thereof, and means including linkage members for axially moving said slidable member in said bore to draw said abutments toward the closed end of said body.

2. In a grommet applicator, a tubular body member provided with a head portion having oppositely directed radial guide apertures therein, a pair of rod-like finger members movable in said apertures and extending from said head, outwardly directed abutments on the outer ends of said finger members, an operating lever having one end pivoted to said body portion adjacent the head, links pivoted at one end to said lever intermediate its ends, said links being pivoted at the other end to a member extending transversely of the tubular body member, the inner ends of said fingers being pivoted to said transversely extending member, said body portion having means for guiding the movement of said transversely extending member longitudinally of the body portion, whereby when said operating lever is moved toward said body portion the head portion and the abutments on the fingers will be moved toward each other.

3. A grommet applicator comprising a tubular body, a head closing one end of said tubular body and provided with a pair of oppositely directed radial guide apertures, said body being provided with oppositely disposed longitudinally extending guide apertures, a generally U-shaped spring rod member having the legs thereof extending through the radial apertures in said head and provided with bent end portions forming laterally extending abutments thereon, the bight portion of said U-shaped rod member being slidable within the tubular body, a slidable pin connected to said bight portion and extending into the longitudinal guide apertures in said body, an operating lever having a pivotal connection with said body adjacent said head, and links connected to the ends of said movable pin and pivotally connected to said operating lever intermediate the ends of said operating lever.

JAN de SWART.

REFERENCES CITED

The following references are of record in the file of this patent:

UNITED STATES PATENTS

| Number | Name | Date |
|---|---|---|
| 1,476,756 | Junkers | Dec. 11, 1923 |
| 1,496,134 | Rumgay | June 3, 1924 |
| 2,027,470 | Caruso | Jan. 14, 1936 |
| 2,150,361 | Chobert | Mar. 14, 1939 |
| 2,205,772 | Bowersox | June 25, 1940 |
| 2,358,703 | Gookin | Sept. 19, 1944 |
| 2,367,265 | Cooper et al. | Mar. 16, 1945 |
| 2,376,684 | Gobin | May 2, 1945 |
| 2,378,546 | Gobin | June 19, 1945 |

FOREIGN PATENTS

| Number | Country | Date |
|---|---|---|
| 322,885 | Germany | June 22, 1919 |

Certificate of Correction

Patent No. 2,441,756.  May 18, 1948.

JAN DE SWART

It is hereby certified that errors appear in the printed specification of the above numbered patent requiring correction as follows: Column 1, line 29, for "of", first occurrence, read *on*; column 2, line 7, before "portion" insert the word *body*; and that the said Letters Patent should be read with these corrections therein that the same may conform to the record of the case in the Patent Office.

Signed and sealed this 31st day of August, A. D. 1948.

[SEAL]

THOMAS F. MURPHY,
*Assistant Commissioner of Patents.*